US012750454B2

(12) United States Patent
Igarashi

(10) Patent No.: US 12,750,454 B2
(45) Date of Patent: Sep. 29, 2026

(54) INFORMATION PROCESSING APPARATUS, NON-TRANSITORY COMPUTER READABLE MEDIUM STORING COMPUTER PROGRAM, AND INFORMATION PROCESSING METHOD

(71) Applicant: FUJIFILM Business Innovation Corp., Tokyo (JP)

(72) Inventor: Tatsuya Igarashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,053

(22) Filed: Mar. 24, 2023

(65) Prior Publication Data

US 2024/0106965 A1 Mar. 28, 2024

(30) Foreign Application Priority Data

Sep. 27, 2022 (JP) ................................. 2022-154096

(51) Int. Cl.
*H04N 1/60* (2006.01)
*G06F 3/12* (2006.01)

(52) U.S. Cl.
CPC ......... *H04N 1/6027* (2013.01); *G06F 3/1204* (2013.01); *G06F 3/1208* (2013.01); *G06F 3/1256* (2013.01)

(58) Field of Classification Search
CPC ...... H04N 1/6027; H04N 1/54; H04N 1/6072; G06F 3/1204; G06F 3/1208; G06F 3/1256
See application file for complete search history.

(56) References Cited

U.S. PATENT DOCUMENTS 10,565,482 B1 * 2/2020 Hayakawa ......... H04N 1/00167
11,137,961 B2 10/2021 Kunimi et al.
2018/0359391 A1 * 12/2018 Tanase ...................... H04N 1/62
2020/0336622 A1 * 10/2020 Kunimi ................ H04N 1/6027
2023/0388436 A1 * 11/2023 Shibamori ............... H04N 1/54
2024/0073351 A1 * 2/2024 Sato ................... H04N 1/00482

FOREIGN PATENT DOCUMENTS

JP 2012058977 3/2012
JP 2020042368 3/2020

OTHER PUBLICATIONS

"Notice of Reasons for Refusal of Japan Counterpart Application No. 2022-154096", issued on Jul. 28, 2026, p. 1-p. 5.

* cited by examiner

*Primary Examiner* — Iriana Cruz

(57) ABSTRACT

An information processing apparatus includes a processor configured to execute a process of detecting drawing designation information that is information for designating a drawing content in document data, and converting, in a case where the detected drawing designation information is a conversion target for filling with a spot color, the drawing designation information into spot color filling information which is information for filling with a target spot color and outputting a result of the conversion, at a time of outputting the document data.

7 Claims, 6 Drawing Sheets

INFORMATION PROCESSING APPARATUS, NON-TRANSITORY COMPUTER READABLE MEDIUM STORING COMPUTER PROGRAM, AND INFORMATION PROCESSING METHOD

CROSS-REFERENCE TO RELATED APPLICATIONS

This application is based on and claims priority under 35 USC 119 from Japanese Patent Application No. 2022-154096 filed Sep. 27, 2022.

BACKGROUND

(i) Technical Field

The present invention relates to an information processing apparatus, a non-transitory computer readable medium storing a computer program, and an information processing method.

(ii) Related Art

JP2012-058977A discloses a printing control device that includes a determination unit, an acquisition unit, a removal unit, and an issuing unit. The determination unit determines whether or not a specific object indicated by an instruction color for specifying a region in which printing is performed by using a spot color recording agent exists in original document data. The acquisition unit acquires the instruction color indicating the specific object determined to exist by the determination unit. The removal unit removes, from the original document data, the specific object determined to exist by the determination unit. The issuing unit issues a drawing command for performing printing for an object with the spot color recording agent, the object being indicated by a color identical to the acquired instruction color among the remaining objects of the original document data, which are obtained by the removal unit removing the specific object.

SUMMARY

In a case where a document to be printed with a spot color is created by an application that does not support the spot color, an operation of opening a setting screen of a printer driver to designate a spot-colored place or checking, on a preview screen, whether the color of the region is replaced with the spot color leads to a decrease in document creation efficiency and leads to work mistakes. Further, as the number of spot colors handled in one document increases, the difficulty of designating the spot color increases.

Aspects of non-limiting embodiments of the present disclosure relate to an information processing apparatus, a non-transitory computer readable medium storing a computer program, and an information processing method that enables designation and check of a spot color location without transition of a screen or a window during an edit of a document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to detect drawing designation information that is information for designating a drawing content in document data, and, in a case where the detected drawing designation information is a conversion target for filling with a spot color, convert the drawing designation information into spot color filling information which is information for filling with a target spot color and output a result of the conversion, at a time of outputting the document data.

BRIEF DESCRIPTION OF THE DRAWINGS

Exemplary embodiment(s) of the present invention will be described in detail based on the following figures, wherein.

DETAILED DESCRIPTION

Figure 1:
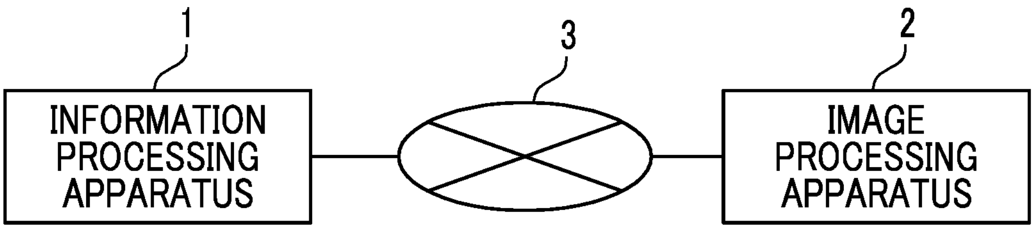
FIG. 1 is a diagram illustrating a schematic configuration of an image processing system according to the present exemplary embodiment.

Hereinafter, an exemplary embodiment of the present invention will be described with reference to the drawings. The identical reference signs are denoted by the same or equivalent components and portions in the drawings. In addition, the dimensional ratios in the drawings are exaggerated for convenience of description and may differ from the actual ratios.

FIG. 1 is a diagram illustrating a schematic configuration of an image processing system according to the present exemplary embodiment.

As illustrated in FIG. 1, the image processing system according to the present exemplary embodiment includes an information processing apparatus 1 and an image forming apparatus 2. In the present exemplary embodiment, only one information processing apparatus 1 and one image forming apparatus 2 will be described, but, in the present invention, a plurality of information processing apparatuses and a plurality of image forming apparatuses may be provided. Further, as the information processing apparatus 1, a personal computer may be applied, or a portable terminal such as a tablet terminal or a smartphone may be applied.

Each of the information processing apparatus 1 and the image forming apparatus 2 is connected to a communication line 3 such as a local area network (LAN) and an intranet. The information processing apparatus 1 and the image forming apparatus 2 are capable of mutually transmitting and receiving various types of data via the communication line 3.

The image forming apparatus 2 is an apparatus that enables not only image formation by using a yellow toner, a magenta toner, a cyan toner, and a black toner, but also image formation with a spot color using a spot color toner such as a bright toner, a white toner, and a transparent toner.

The image forming apparatus 2 according to the present exemplary embodiment is configured to enable designation and check of a spot color location without transition of a screen or a window during an edit of a document by the information processing apparatus 1. The information processing apparatus 1 and the image forming apparatus 2 will be described below in detail.

Figure 2:
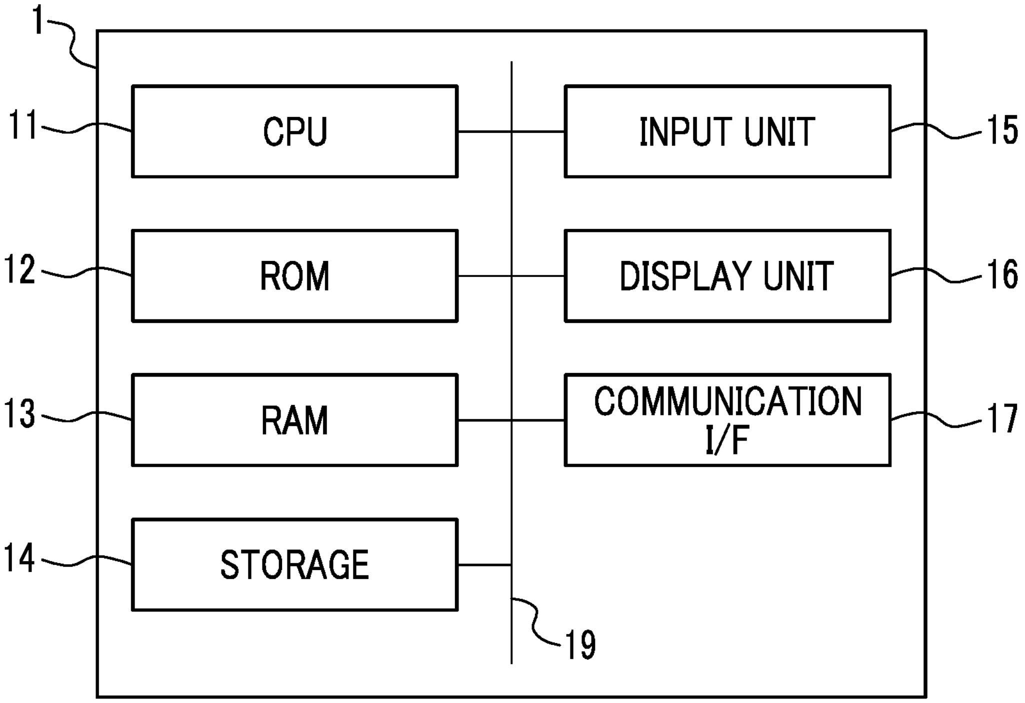
FIG. 2 is a block diagram illustrating a hardware configuration of an information processing apparatus in the present exemplary embodiment.

FIG. 2 is a block diagram illustrating a hardware configuration of the information processing apparatus 1 in the present exemplary embodiment.

As illustrated in FIG. 2, the information processing apparatus 1 includes components such as a central processing unit (CPU) 11, a read only memory (ROM) 12, a random access memory (RAM) 13, a storage 14, an input unit 15, a display unit 16, and a communication interface (UF) 17. The components are connected to each other via a bus 19 to be communicable with each other.

The CPU 11 is a central arithmetic processing unit that executes various programs and controls the units. That is, the CPU 11 reads the program from the ROM 12 or the storage 14, and executes the program using the RAM 13 as a work area. The CPU 11 controls the above components and performs various arithmetic processes, in accordance with the program recorded in the ROM 12 or the storage 14. In the present exemplary embodiment, the ROM 12 or the storage 14 stores an image processing program for spot color-drawing a location designated as drawing of a spot color.

The ROM 12 stores various programs and various types of data. The RAM 13 temporarily stores the program or the data as a work area. The storage 14 is configured by a storage device such as a hard disk drive (HDD) or a solid state drive (SSD), and stores various programs including an operating system and various types of data.

The input unit 15 includes a pointing device such as a mouse, and a keyboard, and the input unit is used for performing various inputs.

The display unit 16 is, for example, a liquid crystal display and displays various types of information. The display unit 16 may adopt a touch panel type and function as the input unit 15.

The communication interface 17 is an interface for communicating with other devices such as the image forming apparatus 2. For example, standards such as Ethernet (registered trademark), FDDI, and Wi-Fi (registered trademark) are used for the communication interface.

In executing the above image processing program, the information processing apparatus 1 realizes various functions by using the above hardware resources. A functional configuration realized by the information processing apparatus 1 will be described.

Figure 3:
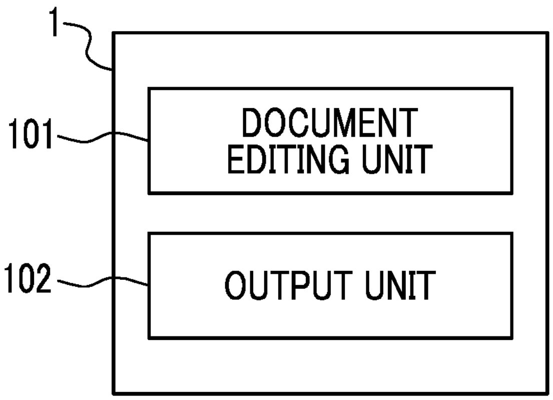
FIG. 3 is a block diagram illustrating an example of a functional configuration of the information processing apparatus.

FIG. 3 is a block diagram illustrating an example of the functional configuration of the information processing apparatus 1.

As illustrated in FIG. 3, the information processing apparatus 1 includes a document editing unit 101 and an output unit 102 as functional components. Each functional component is realized by the CPU 11 reading and executing the image processing program stored in the ROM 12 or the storage 14.

The document editing unit 101 provides a user interface for causing a user to edit document data on the information processing apparatus 1. The document data edited by the user interface provided by the document editing unit 101 can serve as a drawing target in image formation by the image forming apparatus 2. The user can create an object including drawing designation information which is information for designating the drawing content in the spot color by the user interface provided by the document editing unit 101. An example of the drawing designation information will be described later, but, in the present exemplary embodiment, the drawing designation information is set to information for designating filling with a predetermined color or a gradation of a predetermined pattern.

The output unit 102 outputs a printing command for performing printing of the document data that is edited by the user interface provided by the document editing unit 101, to the image forming apparatus 2 via the communication line 3. The image forming apparatus 2 executes an image forming process based on the printing command for performing printing of the document data output from the information processing apparatus 1.

Figure 4:
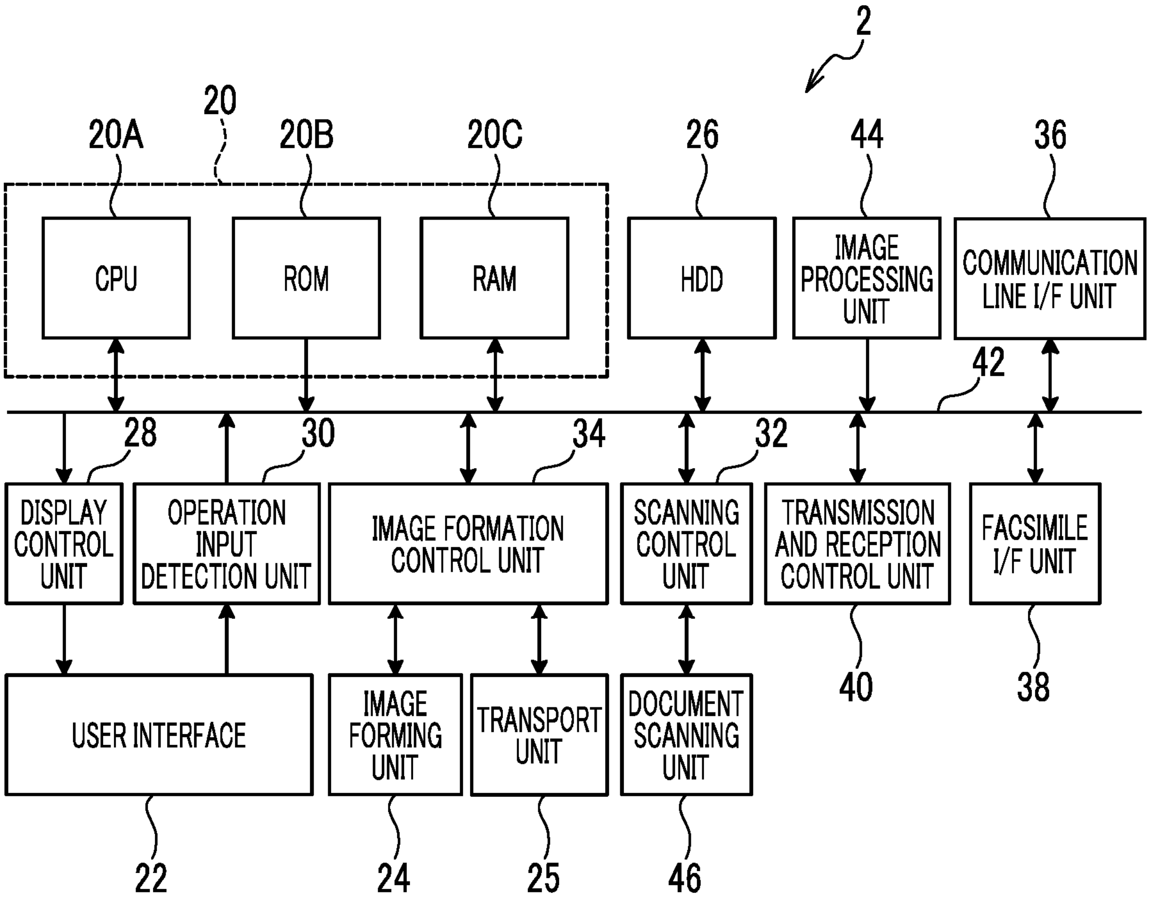
FIG. 4 is a block diagram illustrating a configuration of a main part of an electrical system of an image forming apparatus according to the present exemplary embodiment.

FIG. 4 is a block diagram illustrating the configuration of the main part of an electrical system of the image forming apparatus 2 according to the present exemplary embodiment.

As illustrated in FIG. 4, the image forming apparatus 2 according to the present exemplary embodiment includes a control unit 20 including a CPU 20A, a ROM 20B, and a RAM 20C. The CPU 20A controls the overall operation of the image forming apparatus 2. The RAM 20C is used as a work area or the like during execution of various programs by the CPU 20A. Various control programs, various parameters, and the like are stored in advance in the ROM 20B. In the image forming apparatus 2, the components of the control unit 20 are electrically connected to each other by a system bus 42.

On the other hand, the image forming apparatus 2 according to the present exemplary embodiment includes an HDD 26 that stores various types of data, application programs, and the like. The image forming apparatus 2 further includes a display control unit 28 that is connected to the user interface 22 and controls display of various operation screens and the like on the display of the user interface 22. The image forming apparatus 2 further includes an operation input detection unit 30 that is connected to the user interface 22 and detects an operation instruction input via the user interface 22. In the image forming apparatus 2, the HDD 26, the display control unit 28, and the operation input detection unit 30 are electrically connected to the system bus 42. In the image forming apparatus 2 according to the present exemplary embodiment, an example including the HDD 26 will be described. The present invention is not limited to this, and the image forming apparatus 2 may include a non-volatile storage unit such as a flash memory. In the present exemplary embodiment, the RAM 20C or the HDD 26 stores an image processing program for spot color-drawing a location designated as drawing of a spot color.

The image forming apparatus 2 according to the present exemplary embodiment further includes a scanning control unit 32 and an image formation control unit 34. The scanning control unit 32 controls an optical image scanning operation by a document scanning unit 46 and a document feeding operation by a document transport unit. The image formation control unit 34 controls the image forming process by an image forming unit 24 and transport of paper to the image forming unit 24 by a transport unit 25. The image forming unit 24 performs not only image forming by using a yellow toner, a magenta toner, a cyan toner, and a black toner, but also image forming with a spot color using a spot color toner such as a bright toner, a white toner, and a transparent toner.

The image forming apparatus 2 further includes a communication line interface (communication line I/F) unit 36 and an image processing unit 44. The communication line I/F unit 36 is connected to the communication line 3 and performs transmission and reception of communication data to and from another external device such as the information processing apparatus 1 connected to the communication line 3. The image processing unit 44 executes various image processes. The image forming apparatus 2 further includes a facsimile interface (facsimile I/F) unit 38 that is connected to a telephone line (not illustrated) and performs transmission and reception of facsimile data to and from a facsimile device connected to the telephone line.

The image forming apparatus 2 further includes a transmission and reception control unit 40 that controls transmission and reception of facsimile data via the facsimile interface unit 38. In the image forming apparatus 2, the transmission and reception control unit 40, the scanning control unit 32, the image formation control unit 34, the communication line interface unit 36, the facsimile interface unit 38, and the image processing unit 44 are electrically connected to the system bus 42.

With the above configuration, the image forming apparatus 2 according to the present exemplary embodiment executes an access to each of the RAM 20C, the ROM 20B, and the HDD 26 by the CPU 20A. In addition, the image forming apparatus 2 controls display of information such as an operation screen and various messages on the display of the user interface 22 via the display control unit 28 by the CPU 20A. In addition, the image forming apparatus 2 controls the operation of the document scanning unit 46 and the document transport unit via the scanning control unit 32 by the CPU 20A. In addition, the image forming apparatus 2 performs each of control of the operation of the image forming unit 24 and the transport unit 25 via the image formation control unit 34 and control of the transmission and reception of communication data via the communication line interface unit 36 by the CPU 20A. In addition, the image forming apparatus 2 controls transmission and reception of facsimile data via the facsimile interface unit 38 by the transmission and reception control unit 40 by the CPU 20A. Further, in the image forming apparatus 2, the CPU 20A grasps an operation content in the user interface 22 based on operation information detected by the operation input detection unit 30. The image forming apparatus 2 performs various controls based on the operation content. Forming an image on paper may be referred to as printing below.

The image process by the information processing apparatus 1 described above may be executed by the image forming apparatus 2. Next, the functional configuration of the image forming apparatus 2 will be described.

Figure 5:
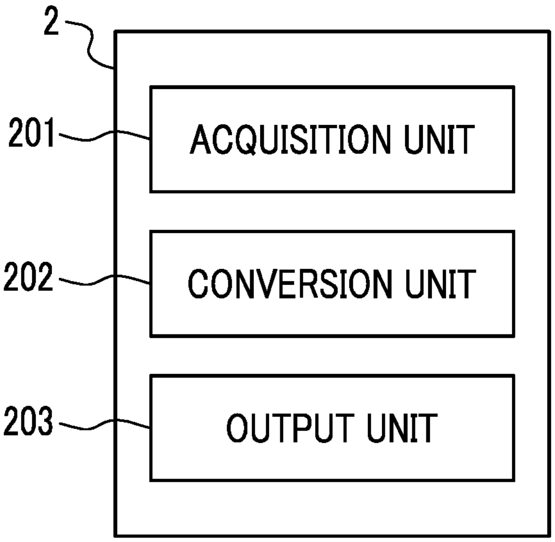
FIG. 5 is a block diagram illustrating an example of a functional configuration of the image forming apparatus.

FIG. 5 is a block diagram illustrating an example of the functional configuration of the image forming apparatus 2.

As illustrated in FIG. 5, the image forming apparatus 2 includes an acquisition unit 201, a conversion unit 202, and an output unit 203 as functional components. Each functional component is realized by the CPU 20A reading and executing the image processing program stored in the ROM 20B or the HDD 26.

The acquisition unit 201 acquires the document data edited by the information processing apparatus 1 via the communication line 3.

The conversion unit 202 detects drawing designation information which is information for designating the drawing content in the document data acquired by the acquisition unit 201. In a case where the detected drawing designation information is a conversion target for filling with the spot color, the conversion unit 202 converts the drawing designation information into spot color filling information which is information for filling with the target spot color and outputs the result of the conversion at the time of outputting the document data.

In a case where the detected drawing designation information is the filling in a predetermined pattern and the pattern coincides with a pattern for conversion into the filling with the spot color, the conversion unit 202 converts the drawing designation information of the document data acquired by the acquisition unit 201 into the corresponding spot color filling information. The preset pattern may be filling with a predetermined color or may be filling in a predetermined pattern.

In a case where the detected drawing designation information is the drawing with a gradation and a rule of the gradation coincides with a rule for conversion into the filling with the spot color, the conversion unit 202 converts the drawing designation information of the document data acquired by the acquisition unit 201 into the corresponding spot color filling information. The rule may include information of a start color, an end color, and a change amount of the gradation.

The output unit 203 outputs the document data converted by the conversion unit 202 to the image forming unit 24 via the image formation control unit 34, and causes the image forming unit 24 to perform image formation based on the document data.

Next, the operation of the image forming apparatus 2 will be described.

Figure 6:
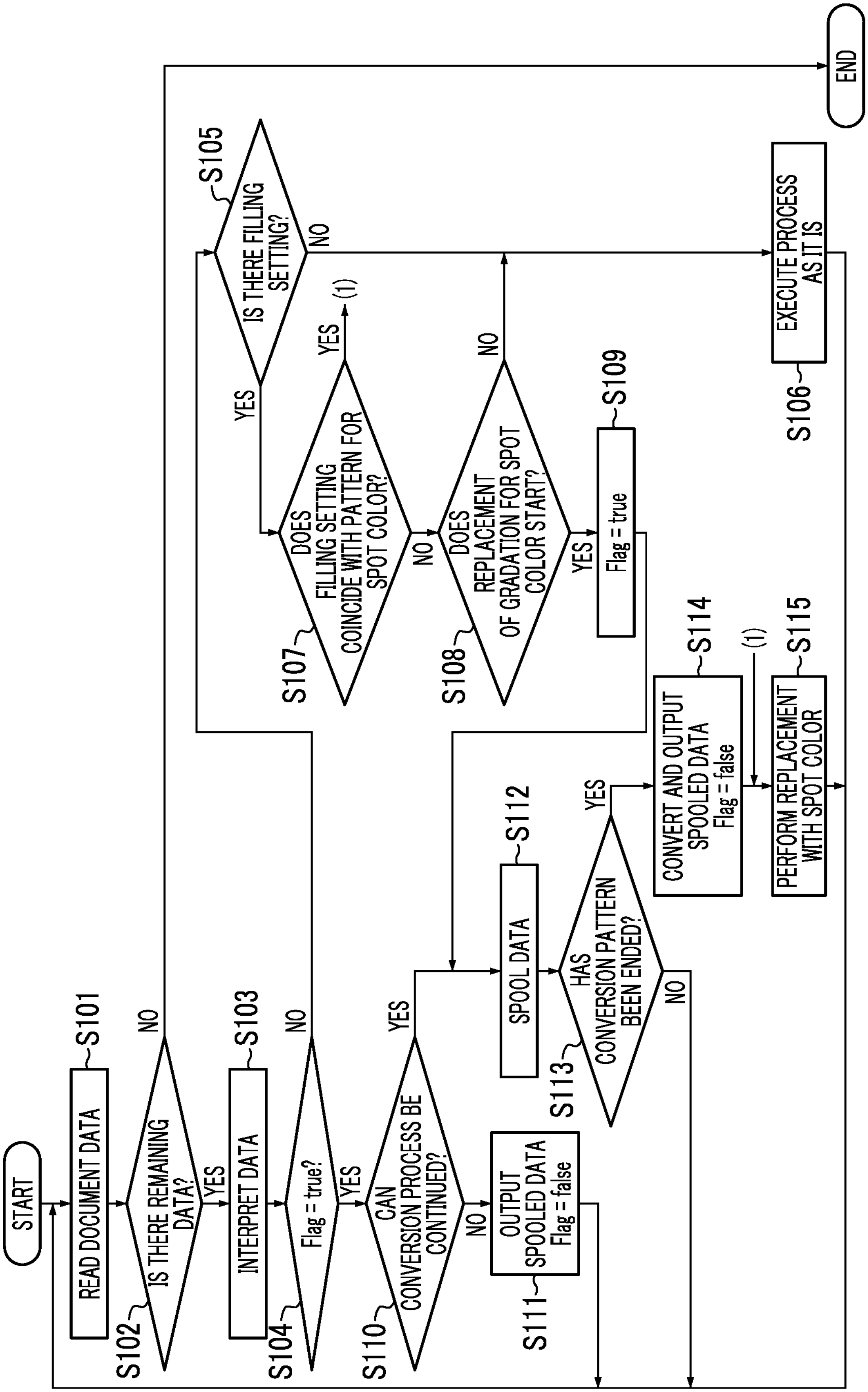
FIG. 6 is a flowchart illustrating a flow of an image process by the image forming apparatus.

FIG. 6 is a flowchart illustrating a flow of an image process by the image forming apparatus 2. The CPU 20A reads the image processing program from the ROM 20B or the HDD 26, loads the image processing program into the RAM 20C, and executes the image process.

The CPU 20A reads document data being an output target in Step S101.

Following Step S101, in Step S102, the CPU 20A determines whether or not there is remaining data of the document data.

In a case where there is no remaining data of the document data as a result of the determination in Step S102 (Step S102; No), the CPU 20A ends a series of processes.

In a case where there is the remaining data of the document data as a result of the determination in Step S102 (Step S102; Yes), the CPU 20A subsequently interprets the document data in Step S103.

Following Step S103, in Step S104, the CPU 20A determines whether or not Flag, which is a flag for replacing the gradation for a spot color with the spot color, is true.

In a case where Flag is not true as a result of the determination in Step S104 (Step S104; No), the CPU 20A subsequently determines whether or not the interpreted document data has a filling setting in Step S105.

In a case where the interpreted document data does not have the filling setting as a result of the determination in Step S105 (Step S105; No), the CPU 20A subsequently processes the interpreted document data as it is in Step S106.

Then, the CPU 20A causes the process to return to Step S101 and continues reading of the document data.

On the other hand, in a case where the interpreted document data has the filling setting as a result of the determination in Step S105 (Step S105; Yes), in Step S107, the CPU 20A subsequently determines whether or not the filling setting coincides with a pattern for a spot color.

Figure 7:
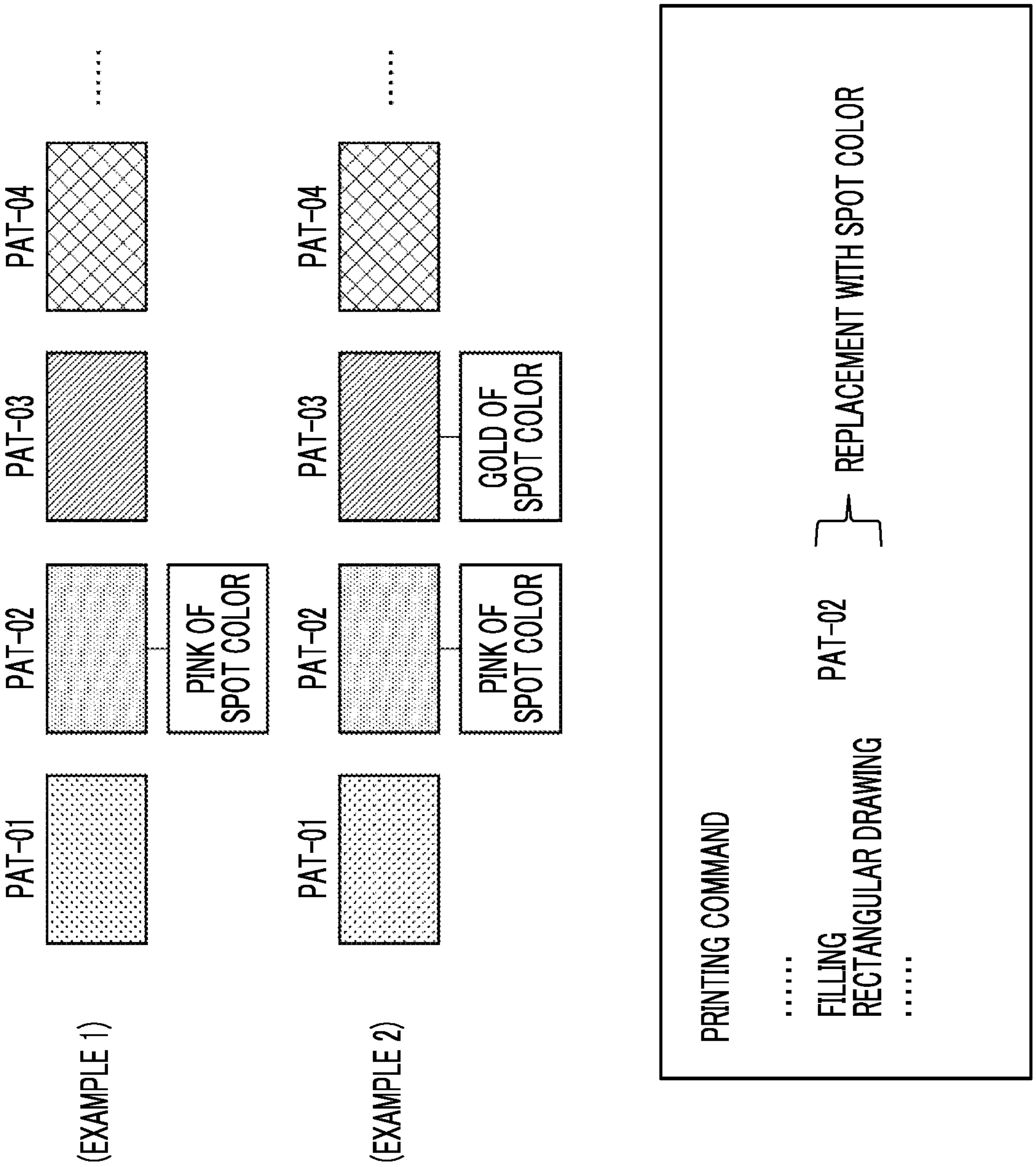
FIG. 7 is a diagram illustrating an example of a relationship between a filling setting and a pattern for a spot color.

FIG. 7 is a diagram illustrating an example of a relationship between the filling setting and the pattern for a spot color. Example 1 of FIG. 7 illustrates an example in which the filling of "PAT-02" is set to be replaced with pink of the spot color. Further, Example 1 of FIG. 7 illustrates an example in which the filling of "PAT-02" is set to be replaced with pink of the spot color, and the fill of "PAT-03" is set to be replaced with gold of the spot color.

FIG. 7 further illustrates an excerpt of a printing command transmitted from the information processing apparatus 1 to the image forming apparatus 2. In a case where the printing command includes the content of "filling PAT-02 rectangular drawing", the CPU 20A processes the printing command to replace this portion with pink of the spot color.

Figure 8:
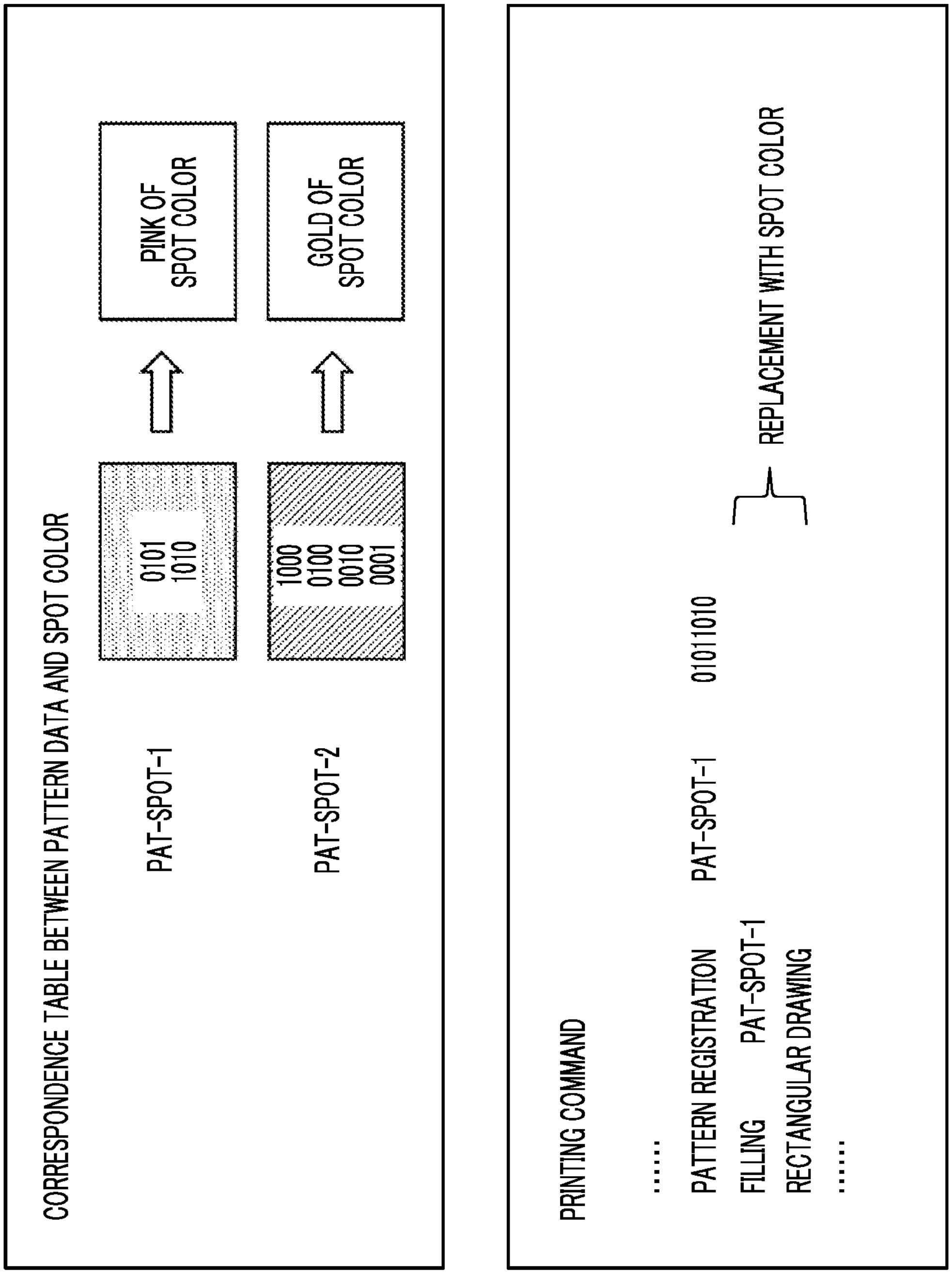
FIG. 8 is a diagram illustrating another example of the relationship between the filling setting and the pattern for the spot color.

FIG. 8 is a diagram illustrating another example of the relationship between the filling setting and the pattern for the spot color. FIG. 8 illustrates an example in which the filling registered as "PAT-SPOT-1" is set to be replaced with pink of the spot color. FIG. 8 further illustrates an example in which the filling registered as "PAT-SPOT-2" is set to be replaced with gold of the spot color.

FIG. 8 further illustrates an excerpt of a printing command transmitted from the information processing apparatus 1 to the image forming apparatus 2. In a case where the printing command includes the content of "pattern registration PAT-SPOT-1 01011010 filling PAT-SPOT-1 rectangular drawing", the CPU 20A processes the printing command to replace this portion with pink of the spot color.

In a case where the filling does not coincide with the pattern for the spot color as a result of the determination in Step S107 (Step S107; No), in Step S108, the CPU 20A subsequently determines whether or not the replacement of the gradation for the spot color with the spot color can be started. The CPU 20A determines whether or not the replacement of the gradation for the spot color with the spot color can be started, based on whether or not the start point of the gradation (for example, the upper left) coincides with a replacement rule with the spot color.

In a case where it is not possible to start the replacement of the gradation for the spot color with the spot color as a result of the determination in Step S108 (Step S108; No), in Step S106, the CPU 20A subsequently processes the interpreted document data as it is. Then, the CPU 20A causes the process to return to Step S101 and continues reading of the document data.

On the other hand, in a case where the replacement of the gradation for the spot color with the spot color can be started as a result of the determination in Step S108 (Step S108; Yes), in Step S109, the CPU 20A subsequently sets the Flag, which is a flag for replacing the gradation for the spot color with the spot color, to true.

In a case where Flag is true as a result of the determination in Step S104 (Step S104; Yes), in Step S110, the CPU 20A subsequently determines whether or not a conversion process of replacing the gradation for the spot color with the spot color can be continued. The CPU 20A determines whether or not the conversion process of replacing the gradation for the spot color with the spot color can be continued, based on whether or not the change amount of the gradation coincides with the replacement rule with the spot color.

Figure 9:
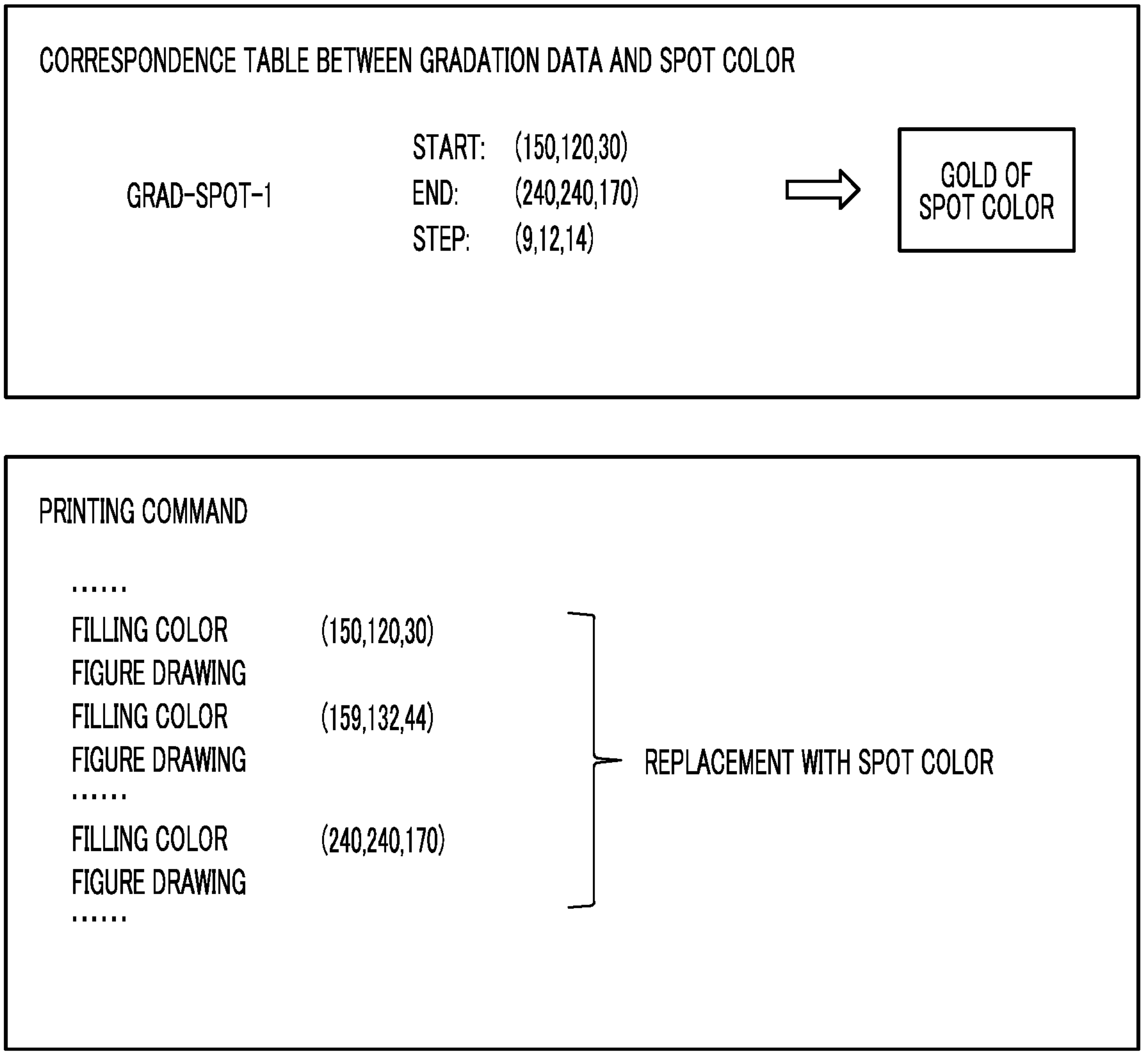
FIG. 9 is a diagram illustrating an example of replacement of a gradation for a spot color with a spot color.

FIG. 9 is a diagram illustrating an example of replacement of the gradation for the spot color with the spot color. FIG. 9 illustrates an example in which the gradation registered as "GRAD-SPOT-1" is set to be replaced with gold of the spot color. This gradation setting includes start coordinates, end coordinates, and a gradation step.

FIG. 9 further illustrates an excerpt of a printing command transmitted from the information processing apparatus 1 to the image forming apparatus 2. In a case where the printing command includes the content illustrated in FIG. 9, the CPU 20A sequentially determines whether or not this portion coincides with the setting for replacement with gold of the spot color. In a case where this portion coincides with the setting for replacement with the spot color, the CPU 20A processes the printing command to replace the gradation with gold of the spot color.

In a case where it is not possible to continue the conversion process of replacing the gradation for the spot color with the spot color as a result of the determination in Step S110 (Step S110; No), in Step S111, the CPU 20A outputs the spooled document data and sets Flag, which is the flag for replacing the gradation for the spot color with the spot color, to false.

On the other hand, in a case where the conversion process of replacing the gradation for the spot color with the spot color can be continued as a result of the determination in Step S110 (Step S110; Yes), the CPU 20A spools the document data in Step S112. Following Step S109, the CPU 20A spools the document data in Step S112.

Following Step S112, in Step S113, the CPU 20A determines whether or not a conversion process of the gradation for spot color has been ended.

In a case where the conversion process of the gradation for spot color is not ended as a result of the determination in Step S113 (Step S113; No), the CPU 20A causes the process to return to Step S101 and continues reading of the document data.

On the other hand, in a case where the conversion process of the gradation for spot color has been ended as a result of the determination in Step S113 (Step S113; Yes), the CPU 20A converts and outputs the spooled data in Step S114, and changes Flag to false.

Following Step S114, in Step S115, the CPU 20A replaces the gradation with the spot color and outputs the result of the replacement. Then, the CPU 20A causes the process to return to Step S101 and continues reading of the document data. Further, in a case where the filling coincides with the pattern for the spot color as a result of the determination in Step S107 (Step S107; Yes), in Step S115, the CPU 20A replaces the filling with the spot color and outputs the result of the replacement. Then, the CPU 20A causes the process to return to Step S101 and continues reading of the document data.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

In each exemplary embodiment, the aspect in which the image processing program is stored (installed) in advance in the ROM or the storage has been described, but the present invention is not limited to this. The program may be provided in a form of being recorded on a non-transitory medium such as a compact disk read only memory (CD-ROM), a digital versatile disk read only memory (DVD-ROM), and a universal serial bus (USB) memory. Further, the program may be in a form of being downloaded from an external device via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Additional Note (((1)))

An information processing apparatus comprising:

a processor configured to:

execute a process of detecting drawing designation information that is information for designating a drawing content in document data, and converting, in a case where the detected drawing designation information is a conversion target for filling with a spot color, the drawing designation information into spot color filling information which is information for filling with a target spot color and outputting a result of the conversion, at a time of outputting the document data.

(((2)))

The information processing apparatus according to (((1))), wherein the processor is configured to:

in a case where the drawing designation information is filling in a predetermined pattern and the pattern coincides with a preset pattern for conversion into the filling with the spot color, convert the drawing designation information into the corresponding spot color filling information and output a result of the conversion, at the time of outputting the document data.

(((3)))

The information processing apparatus according to (((2))), wherein the preset pattern is filling with a predetermined color.

(((4)))

The information processing apparatus according to (((2))), wherein the preset pattern is filling in a predetermined pattern.

(((5)))

The information processing apparatus according to (((1))), wherein the processor is configured to:

in a case where the drawing designation information is a drawing with a gradation and a rule of the gradation coincides with a rule for conversion into the filling with the spot color, convert the drawing designation information into the corresponding spot color filling information and output a result of the conversion, at the time of outputting the document data.

(((6)))

The information processing apparatus according to (((5))), wherein the rule includes information of a start color, an end color, and a change amount of the gradation.

(((7)))

A non-transitory computer readable medium storing a computer program causing a computer to execute a process comprising:

detecting drawing designation information that is information for designating a drawing content in document data; and converting, in a case where the detected drawing designation information is a conversion target for filling with a spot color, the drawing designation information into spot color filling information which is information for filling with a target spot color and outputting a result of the conversion, at a time of outputting the document data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

execute a process of detecting drawing designation information that is information for designating a drawing content in document data without generating a preview screen for receiving an operation to designate the drawing content in the document data, and converting, in a case where the detected drawing designation information is a conversion target for filling with a spot color, the drawing designation information into spot color filling information which is information for filling with a target spot color and outputting a result of the conversion, at a time of outputting the document data, wherein the processor is further configured to:

in a case where the drawing designation information is filling in a predetermined pattern and the pattern coincides with a preset pattern for conversion into the filling with the spot color, convert the drawing designation information into the corresponding spot color filling information and output a result of the conversion, at the time of outputting the document data.

2. The information processing apparatus according to claim 1, wherein the preset pattern is filling with a predetermined color.

3. The information processing apparatus according to claim 1, wherein the preset pattern is filling in a predetermined pattern.

4. The information processing apparatus according to claim 1, wherein the processor is configured to:

in a case where the drawing designation information is a drawing with a gradation and a rule of the gradation coincides with a rule for conversion into the filling with the spot color, convert the drawing designation information into the corresponding spot color filling information and output a result of the conversion, at the time of outputting the document data.

5. The information processing apparatus according to claim 4, wherein the rule includes information of a start color, an end color, and a change amount of the gradation.

6. A non-transitory computer readable medium storing a computer program causing a computer to execute a process comprising:

detecting drawing designation information that is information for designating a drawing content in document data without generating a preview screen for receiving an operation to designate the drawing content in the document data;

converting, in a case where the detected drawing designation information is a conversion target for filling with a spot color, the drawing designation information into spot color filling information which is information for filling with a target spot color and outputting a result of the conversion, at a time of outputting the document data; and in a case where the drawing designation information is filling in a predetermined pattern and the pattern coincides with a preset pattern for conversion into the filling with the spot color, converting the drawing designation information into the corresponding spot color filling information and outputting a result of the conversion, at the time of outputting the document data.

7. An information processing method comprising:

detecting drawing designation information that is information for designating a drawing content in document data without generating a preview screen for receiving an operation to designate the drawing content in the document data;

converting, in a case where the detected drawing designation information is a conversion target for filling with a spot color, the drawing designation information into spot color filling information which is information for filling with a target spot color and outputting a result of the conversion, at a time of outputting the document data; and in a case where the drawing designation information is filling in a predetermined pattern and the pattern coincides with a preset pattern for conversion into the filling with the spot color, converting the drawing designation information into the corresponding spot color filling information and outputting a result of the conversion, at the time of outputting the document data.

* * * * *